(12) United States Patent
Lei et al.

(10) Patent No.: US 12,055,672 B2
(45) Date of Patent: Aug. 6, 2024

(54) SYSTEM AND METHOD FOR GENERATING SLOWNESS LOGS IN THINLY LAMINATED FORMATIONS

(71) Applicant: SCHLUMBERGER TECHNOLOGY CORPORATION, Sugar Land, TX (US)

(72) Inventors: Ting Lei, Arlington, MA (US); Sandip Bose, Chestnut Hill, MA (US); Smaine Zeroug, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 507 days.

(21) Appl. No.: 17/288,622

(22) PCT Filed: Oct. 24, 2019

(86) PCT No.: PCT/US2019/057912
§ 371 (c)(1),
(2) Date: Apr. 26, 2021

(87) PCT Pub. No.: WO2020/086880
PCT Pub. Date: Apr. 30, 2020

(65) Prior Publication Data
US 2021/0396902 A1 Dec. 23, 2021

Related U.S. Application Data

(60) Provisional application No. 62/751,060, filed on Oct. 26, 2018.

(51) Int. Cl.
*G01V 1/50* (2006.01)
*E21B 47/14* (2006.01)
*G01V 1/46* (2006.01)

(52) U.S. Cl.
CPC ............. *G01V 1/50* (2013.01); *E21B 47/14* (2013.01); *G01V 1/46* (2013.01);
(Continued)

(58) Field of Classification Search
CPC .... G01V 1/50; G01V 1/46; G01V 2210/1429; G01V 2210/6169; G01V 2210/74; E21B 47/14
See application file for complete search history.

(56) References Cited

U.S. PATENT DOCUMENTS 6,477,112 B1 * 11/2002 Tang .................. G01V 1/48
367/33
6,845,325 B2    1/2005 Valero et al.
(Continued)

FOREIGN PATENT DOCUMENTS

WO         9859264 A1    12/1998
WO      2017210231 A1    12/2017

OTHER PUBLICATIONS

Kimball & Marzetta, "Semblance processing of borehole acoustic array data", Geophysics, 49(3),1984, pp. 274-281.
(Continued)

*Primary Examiner* — John H Le
(74) *Attorney, Agent, or Firm* — Ashley E. Brown

(57) ABSTRACT

A method, computer program product, and computing system for generating high resolution slowness logs. The method computer program product, and computing system includes receiving a plurality of sonic logs from at least one sensor array and generating at least one high-resolution slowness log from the plurality of sonic logs based upon, at least in part, monopole and dipole data from the plurality of sonic logs.

17 Claims, 19 Drawing Sheets

(52) U.S. Cl.
    CPC ............... *G01V 2210/1429* (2013.01); *G01V 2210/6169* (2013.01); *G01V 2210/624* (2013.01); *G01V 2210/74* (2013.01)

(56) References Cited

U.S. PATENT DOCUMENTS

| | | |
|---|---|---|
| 6,957,572 B1 | 10/2005 | Wu |
| 6,963,803 B2 | 11/2005 | Heliot et al. |
| 2017/0329031 A1 | 11/2017 | Collins |
| 2018/0038980 A1* | 2/2018 | Goodyear ............... G01V 1/50 |

OTHER PUBLICATIONS

Ekstrom, "Dispersion estimation from borehole acoustic arrays using a modified matrix pencil algorithm", presented at the 29th Asilomar Conference on Signals, Systems, and Computers, 1996, pp. 449-453.

Randall et al., "Multipole borehole acoustic waveforms: Synthetic logs with beds and borehole washouts", Geophysics, 56(11), Nov. 1991, pp. 1757-1769.

Wang et al., "Enhanced-resolution dipole sonic logging data processing", SEG International Exposition and 88th Annual Meeting, 2018, p. 679-683.

International Preliminary Report on Patentability of International Patent Application No. PCT/US2019/057912 dated May 6, 2021, 7 pages.

Rao et al., "Generalized Inverse of Matrices and its Applications", New York: John Wiley & Sons. p. 240, 1971.

\* cited by examiner

10

- receiving a plurality of sonic logs from at least one sensor array (200)
  - receiving the plurality of sonic logs from a plurality of sensor sub-arrays of the at least one sensor array, wherein each sensor sub-array comprises a different number of receivers (220)

- generating at least one high-resolution slowness log from the plurality of sonic logs based upon, at least in part, monopole and dipole data from the plurality of sonic logs (210)
  - defining an axial transformation function of the at least one sensor array (240)
  - inverting the plurality of sonic logs based upon, at least in part, the axial transformation function of the at least one sensor array (242)
  - extracting compressional (P) and shear (S) logs at high frequencies from the plurality of sonic logs (250)

- generating the plurality of sonic logs while the at least one sensor array crosses a thinly-laminated formation (230)

- relabeling one or more coherence peaks if a mismatch between a reconstructed log and a measured log is above a certain threshold (260)
  - generating a quality control log from the mismatch between the reconstructed and measured logs (270)
  - using the quality control log to select one or more coherence peaks and remove outliers (272)

FIG. 2

SYSTEM AND METHOD FOR GENERATING SLOWNESS LOGS IN THINLY LAMINATED FORMATIONS

CROSS-REFERENCE TO RELATED APPLICATION(S)

This application claims the benefit of U.S. Provisional Application No. 62/751,060, filed on Oct. 26, 2018; the contents of which are incorporated herein, in its entirety, by reference.

FIELD

The present disclosure generally applies to the field of borehole sonic waveform processing.

BACKGROUND

Advanced sonic logging tools are generally equipped with an array of receivers to improve reliability in sonic slowness measurements. Slowness measured by an array of receivers generally have a resolution of several feet, depending on the operating frequency and the number of array receivers.

In a thinly laminated formation, the slowness measured will be an average of the several layers covered by the receiver aperture. To obtain a better resolution, sonic logs can be processed from fewer receivers at a higher frequency but then may suffer from errors due to borehole conditions, logging conditions, and thin layer effects.

SUMMARY

In some implementations, a method is executed on a computing system (e.g., as a computer program product) for generating high resolution slowness logs are provided. For example, a plurality of sonic logs may be received from at least one sensor array. At least one high-resolution slowness log may be generated from the plurality of sonic logs based upon, at least in part, monopole and dipole data from the plurality of sonic logs.

In some implementations, receiving the plurality of sonic logs received from at least one sensor array may include receiving the plurality of sonic logs from a plurality of sensor sub-arrays of the at least one sensor array, wherein each sensor sub-array comprises a different number of receivers. The plurality of sonic logs may be generated while the at least one sensor array crosses a thinly-laminated formation. Generating at least one high-resolution slowness logs may include defining an axial transformation function of the at least one sensor array and inverting the plurality of sonic logs based upon, at least in part, the axial transformation function of the at least one sensor array. Generating the plurality of high-resolution slowness logs may include extracting one or more of compressional (P) logs and shear (S) logs from the plurality of sonic logs.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

FIG. 2 illustrates an example flowchart of a slowness log generation process according to one or more example implementations of the disclosure;

Like reference symbols in the various drawings may indicate like elements.

DETAILED DESCRIPTION

Figure 1:
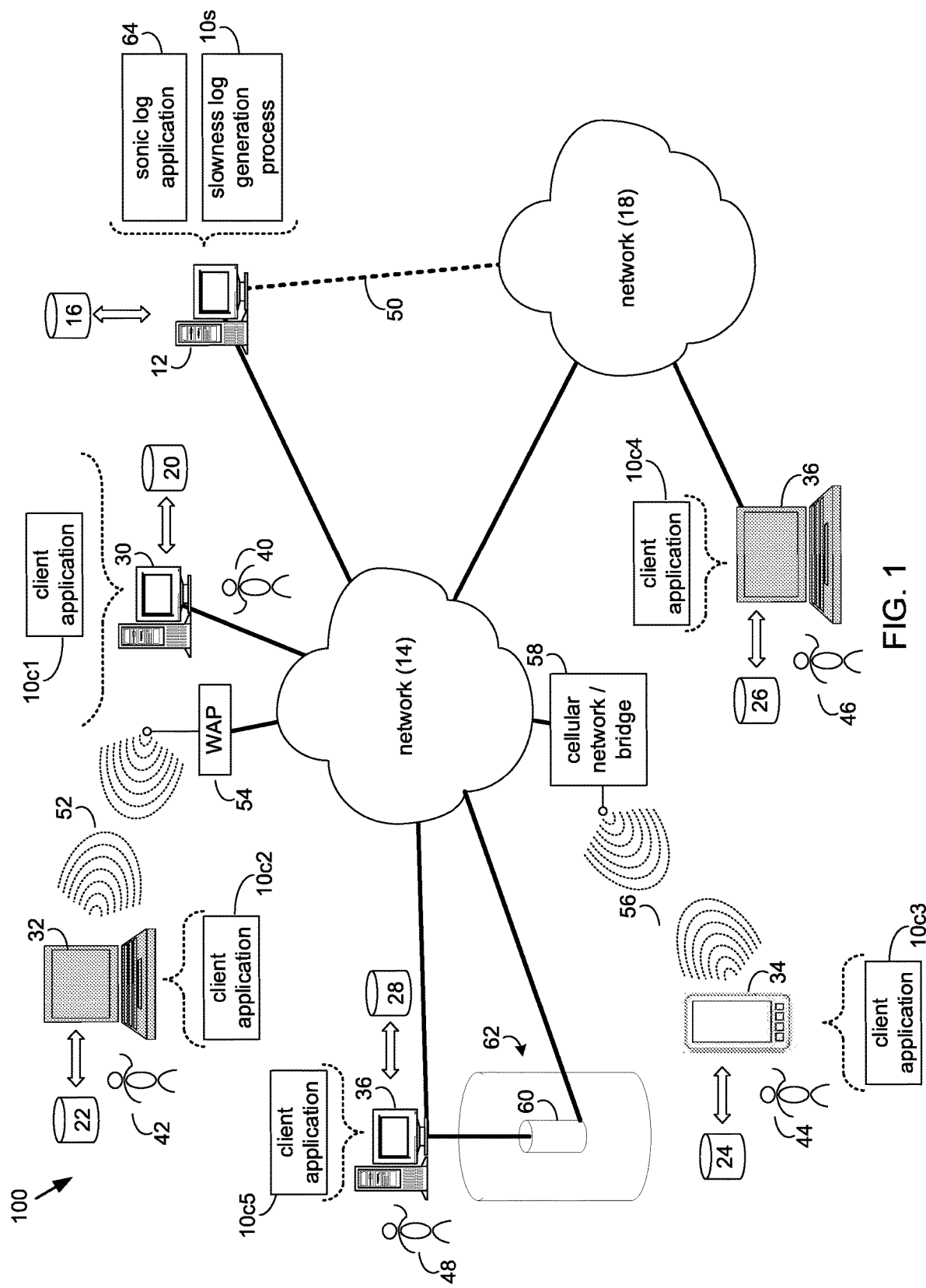
FIG. 1 is a diagrammatic view of a distributed computing network including a computing device that executes a slowness log generation process according to an implementation of the present disclosure.

As will be discussed in greater detail below, embodiments of the present disclosure may yield higher-resolution sonic logs than existing, conventional processing methods. The higher-resolution logs can be used to deliver better layer elastic properties and high-resolution mechanical earth models. Such properties and models may be important inputs for wellbore stability analysis and rock hydraulic fracture simulations and design optimization. Embodiments of the present disclosure yield a quality control log generated from the mismatch between the reconstructed and measured logs, which can be used to pick the coherence peaks and remove outliers.

The discussion included herein is directed to certain implementations. It is to be understood that the present disclosure is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "computer-readable medium" includes but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1-2, there is shown slowness log generation process 10. For the following discussion, it is intended to be understood that slowness log generation process 10 may be implemented in a variety of ways. For example, slowness log generation process 10 may be implemented as a server-side process, a client-side process, or a server-side/client-side process.

For example, slowness log generation process 10 may be implemented as a purely server-side process via slowness log generation process 10s. Alternatively, slowness log generation process 10 may be implemented as a purely client-side process via one or more of client-side application 10c1, client-side application 10c2, client-side application 10c3, and client-side application 10c4. Alternatively still, slowness log generation process 10 may be implemented as a server-side/client-side process via server-side slowness log generation process 10s in combination with one or more of client-side application 10c1, client-side application 10c2, client-side application 10c3, client-side application 10c4, and client-side application 10c5. In such an example, at least a portion of the functionality of slowness log generation process 10 may be performed by slowness log generation process 10s and at least a portion of the functionality of slowness log generation process 10 may be performed by one or more of client-side application 10c1, 10c2, 10c3, 10c4, and 10c5.

Accordingly, slowness log generation process 10 as used in this disclosure may include any combination of slowness log generation process 10s, client-side application 10c1, client-side application 10c2, client-side application 10c3, client-side application 10c4, and client-side application 10c5.

Slowness log generation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of slowness log generation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

The instruction sets and subroutines of client-side application 10c1, 10c2, 10c3, 10c4, 10c5 which may be stored on storage devices 20, 22, 24, 26, 28 (respectively) coupled to client electronic devices 30, 32, 34, 36, 38 (respectively), may be executed by one or more processors (not shown) and one or more memory architectures (not shown) incorporated into client electronic devices 30, 32, 34, 36, 38 (respectively). Examples of storage devices 20, 22, 24, 26, 28 may include but are not limited to: hard disk drives; tape drives; optical drives; RAID devices; random access memories (RAM); read-only memories (ROM), and all forms of flash memory storage devices.

Examples of client electronic devices 30, 32, 34, 36, 38 may include, but are not limited to, personal computer 30, 36, laptop computer 32, mobile computing device 34, notebook computer 36, a netbook computer (not shown), a server computer (not shown), a gaming console (not shown), a data-enabled television console (not shown), and a dedicated network device (not shown). Client electronic devices 30, 32, 34, 36, 38 may each execute an operating system.

Users 40, 42, 44, 46, 48 may access slowness log generation process 10 directly through network 14 or through secondary network 18. Further, slowness log generation process 10 may be accessed through secondary network 18 via link line 50.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 52 established between laptop computer 30 and wireless access point (WAP) 54. Similarly, mobile computing device 32 is shown wirelessly coupled to network 14 via wireless communication channel 56 established between mobile computing device 32 and cellular network/bridge 58, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 52 between laptop computer 30 and WAP 54. Additionally, personal computer 34 is shown directly coupled to network 18 via a hardwired network connection.

In some implementations, a client electronic device (e.g., client electronic device 38) may be electronically coupled to at least one array-based sonic logging tool (such as those available from the Assignee of the present disclosure) configured to be deployed into, or adjacent, a well (e.g., well 62) or other structure.

In some embodiments, slowness log generation process 10 may communicate with, interact with, and/or include a component or module of a sonic log application (e.g., sonic log application 64).

In an embodiment, the instruction sets and subroutines of sonic log application 64 may be stored, e.g., on storage device 16 associated with server computer 12, which executes sonic log application 64, and/or another suitable storage device. Further, users (e.g., one or more of users 40, 42, 44, 46, 48) may access sonic log application 64 in order to access well logs and other data received from sonic logging tool 60 or other mechanisms. The users may access sonic log application 64 via one or more suitable applications, such as client-side applications 10c1-10c5 (e.g., which may include a web browser, a client electronic meeting application, or another application) and/or via a different application (not shown). Additionally, while some users are depicted as being connected with server computer 12 (and therefore with electronic sonic log application 64) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of slowness log generation process 10 may be provided by one or more of client-side applications 10c1-10c5. For example, in some embodiment's slowness log generation process 10 (and/or client-side functionality of slowness log generation process 10) may be included within and/or interactive with client-side applications 10c1-10c5, which may include client side electronic sonic log applications, web browsers, or another application. Various additional/alternative configurations may be equally utilized.

As will be discussed in greater detail below and in some implementations of the present disclosure, slowness log generation process 10 may deliver high resolution sonic logs from array sonic tools both spatially (geometrically in layering) and in slowness (in slowness contrast) and select the correct coherence peaks utilizing the trend from logs processed with different sub-array sizes. In some implementations, slowness log generation process 10 may address logging in a vertical well application. Further, the formation may be isotropic or TIV (transversely isotropic with a vertical axis of symmetry). Slowness log generation process 10 may also be model-independent and consequently may be applied to any array-based sonic logging tool (such as those available from the Assignee of the present disclosure).

For example, array-based borehole sonic waveform processing techniques, such as the Slowness-Time-Coherence (STC) and the modified matrix pencil algorithm, are commonly used to get reliable compressional and shear slownesses of the rock formation that surrounds the borehole. See Kimball et al. "Semblance processing of borehole acoustic array data", Geophysics, 49(3), 274-281, 1984 and Ekstrom, M. "Dispersion estimation from borehole acoustic arrays using a modified matrix pencil algorithm": presented at the 29th Asilomar Conference on Signals, Systems, and Computers, 1995. These methods attempt to search the slowness of sonic waveforms traveling across an array of receivers. For example, borehole sonic tools, available from the Assignee of the present disclosure, has 13 axial receiving stations. In some implementations, the slowness values may be defined at the measurement depth, which is located at the middle of the receiver array. However, due to the axial heterogeneity of formation's elastic properties, the estimated slowness at the measurement depth represents an averaged value of the slowness variations within the receiver aperture.

The averaging may be dependent on the signal wavelength and scales spatially from centimeters to meters.

Figure 3:
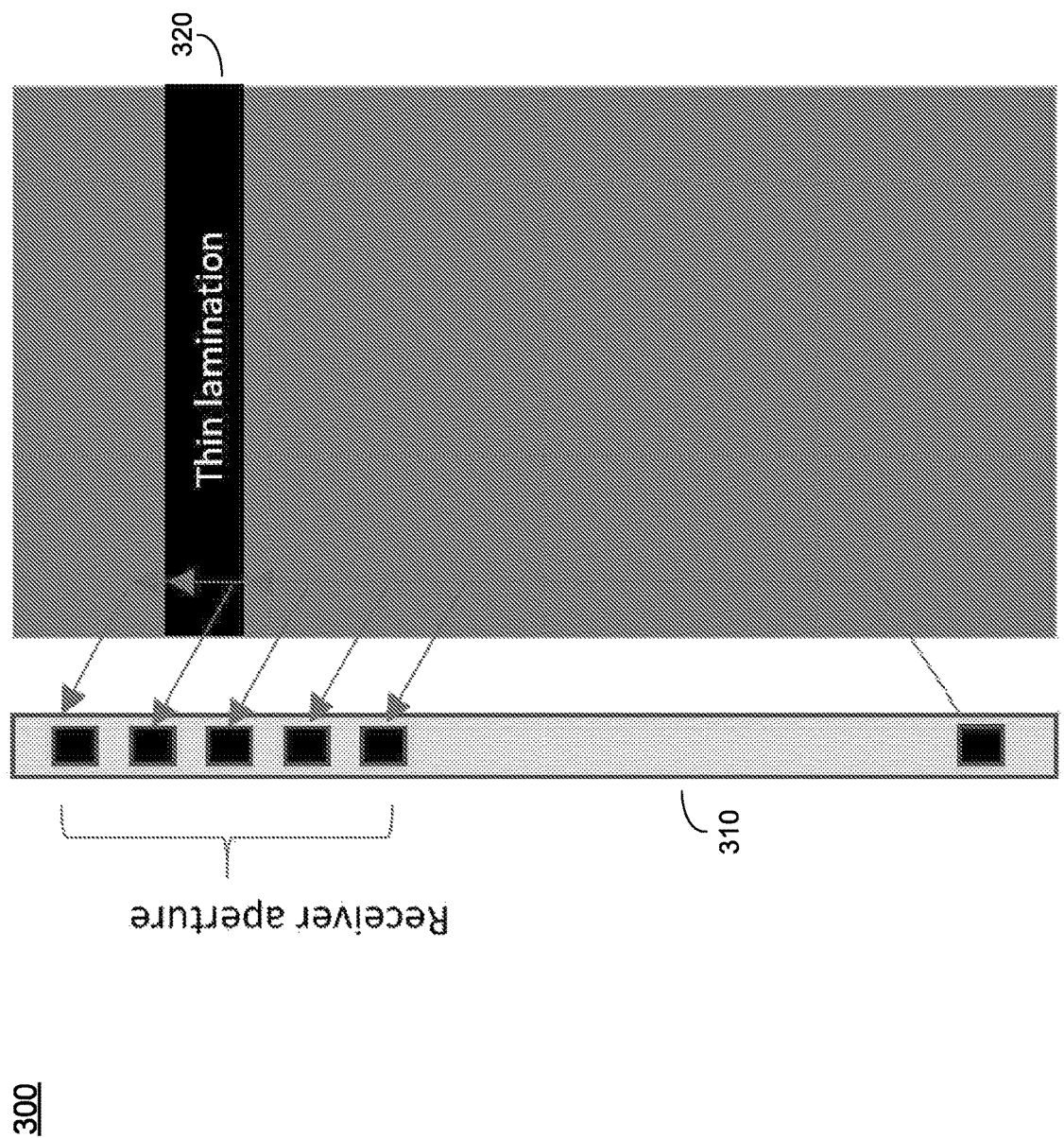
FIG. 3 illustrates a schematic view of an array sonic logging tool crossing a thinly-laminated formation interval (in black) in accordance with implementations of various techniques described herein.

Referring also to FIG. 3, a sonic logging tool 310 may cross a thinly-laminated formation 320. In some implementations, averaged slowness values can be different when using different Number of Receiver Sub-Arrays (NRSA) and different acquisition frequencies.

Figure 4:
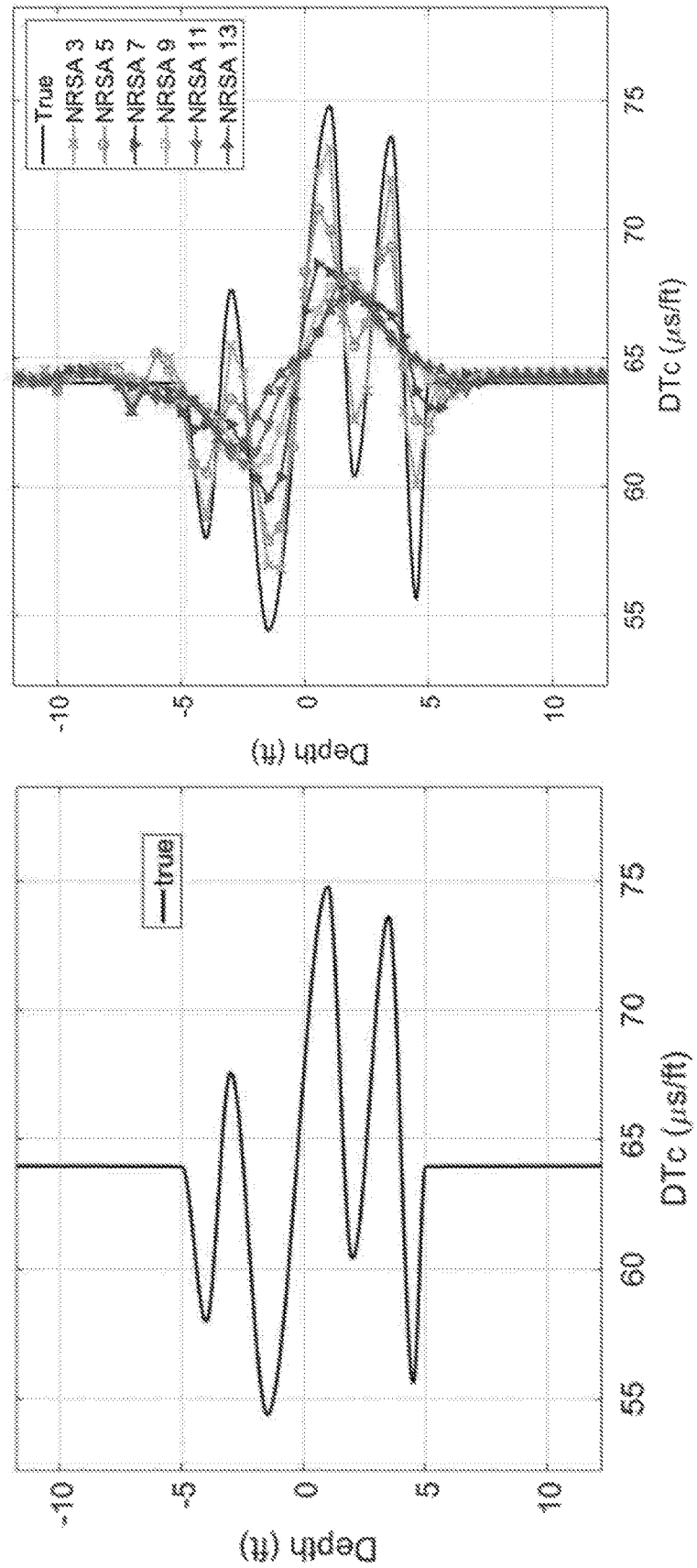
FIG. 4 illustrates a STC (slowness-time-coherence) log processed using different number of receiver sub-arrays in accordance with implementations of various techniques described herein, where the left portion of FIG. 4 illustrates the true formation P slowness and the right portion of FIG. 4 illustrates P slowness logs processed with different number of receivers from 3 to 13.
Figure 5:
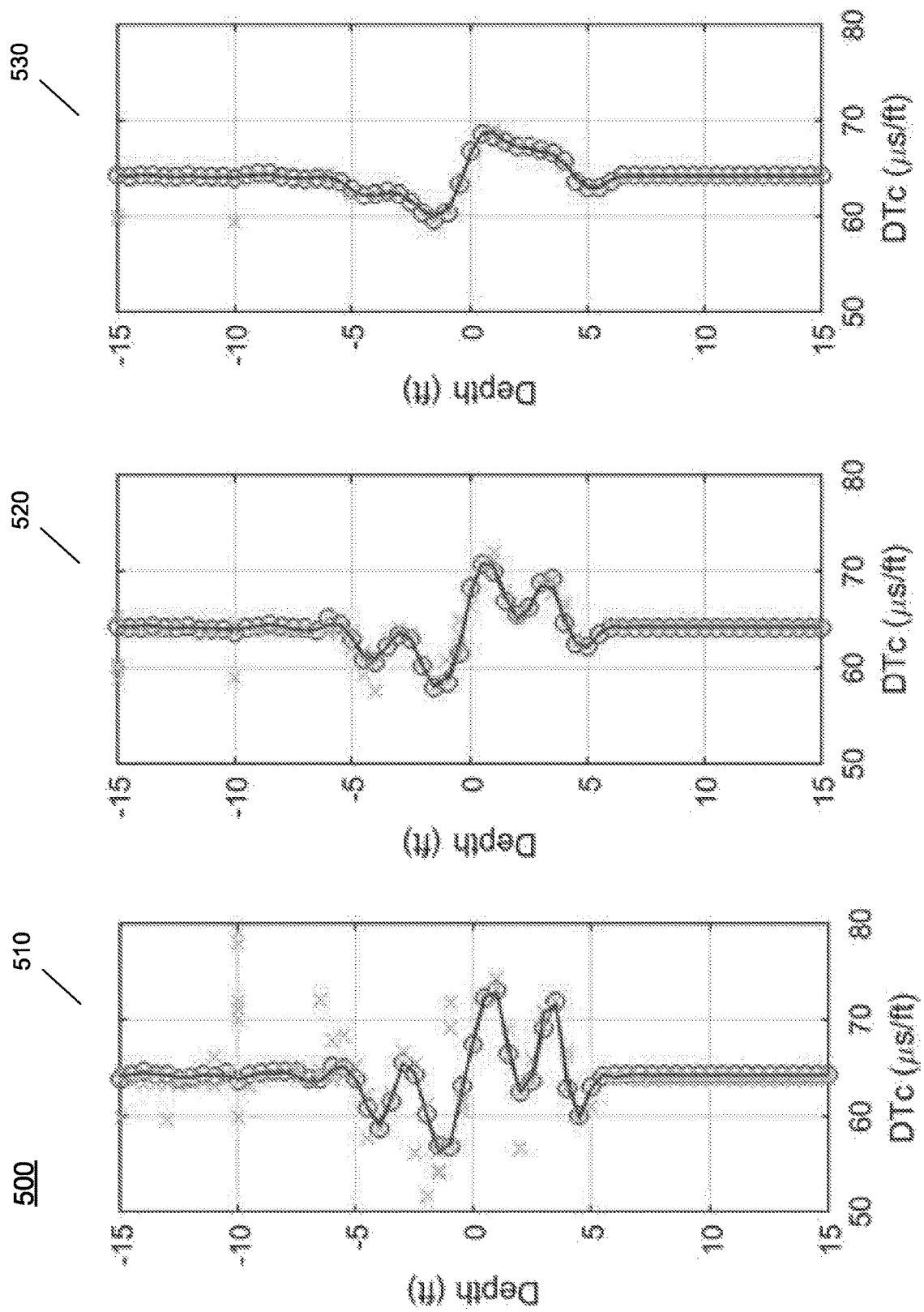
FIG. 5 illustrates compressional STC (slowness-time-coherence) logs processed using 3 receivers (left), 5 receivers (center), and 7 receivers (right) in accordance with implementations of various techniques described herein.

In some implementations and referring also to FIG. 4, where the STC method is applied with NRSA of 13, 11, 9, 7, 5, and 3 from the sonic logging tool (e.g., sonic logging tool 60 in FIG. 1 and sonic logging tool 310 in FIG. 3). A slowness trend may be observed, where processing with fewer receivers may give higher contrast in the slownesses of the adjacent layers. This trend may provide redundant information about the true slowness contrast of the thin layer. However, as shown in FIG. 5, logs processed with fewer receivers tend to have larger uncertainties and may have multiple coherence peaks (marked as 'x' in FIG. 5). In FIG. 5, STC log 510 has fewer receivers than STC log 520, and STC log 520 has fewer receivers than STC log 530.

Figure 6:
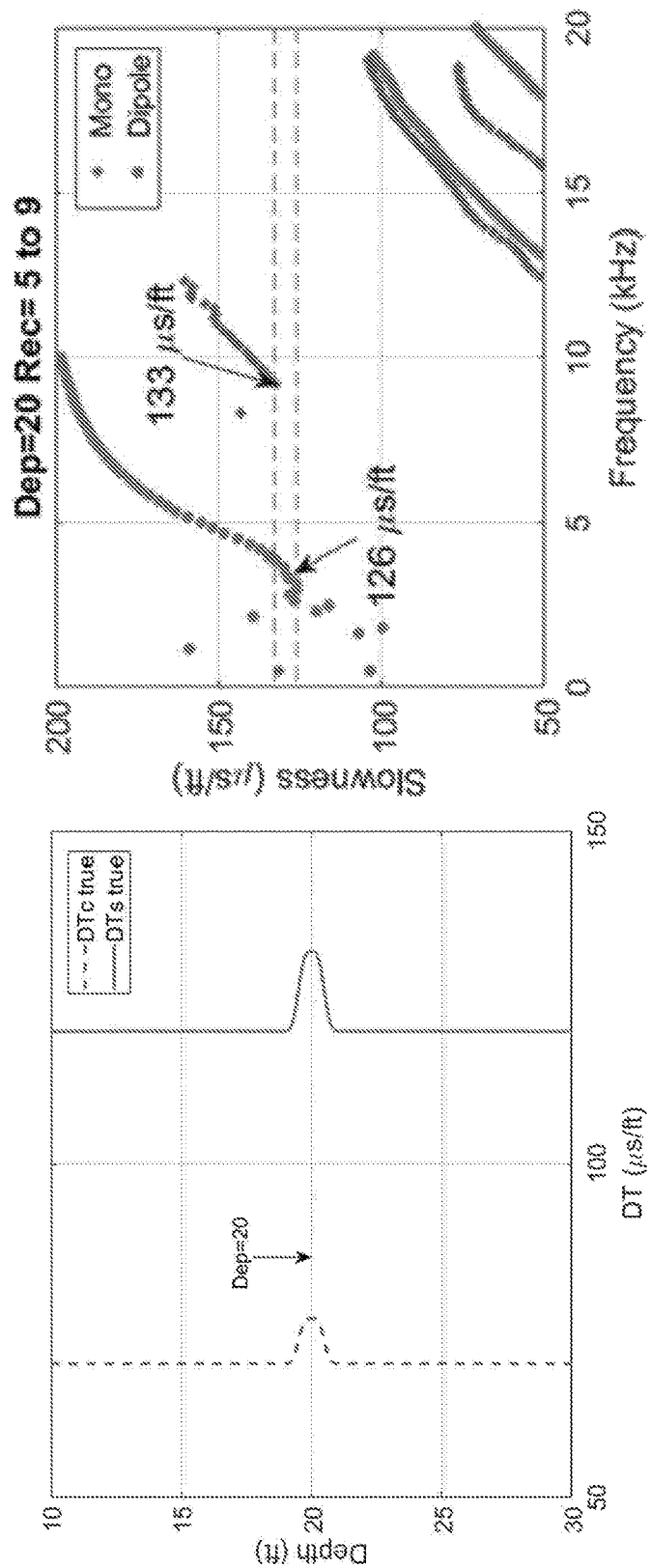
FIG. 6 illustrates a synthetic example of sonic shear slowness extracted from the high-frequency monopole (marked as '+') and low-frequency dipole (marked as 'O') in accordance with implementations of various techniques described herein.

Another illustrative example is shown in FIG. 6, where sonic shear slownesses may be processed with the high-frequency monopole and low-frequency dipole waveforms, respectively. Both slownesses may be processed with the same number of sub-array receivers. The true value of the shear slowness at depth of e.g., 20 feet may be e.g., 132 us/ft. Consequently, the shear slowness of 133 us/ft from high-frequency monopole waveform can give more accurate slowness resolution than the shear from low-frequency dipole, which gives 126 us/ft. This observation represents the part of the frequency effects in the sonic waveform processing for thinly laminated formations (the other part has to do with the difference between the monopole and dipole mode probing modality).

Slownesses Extracted at Different Frequencies

Figure 7:
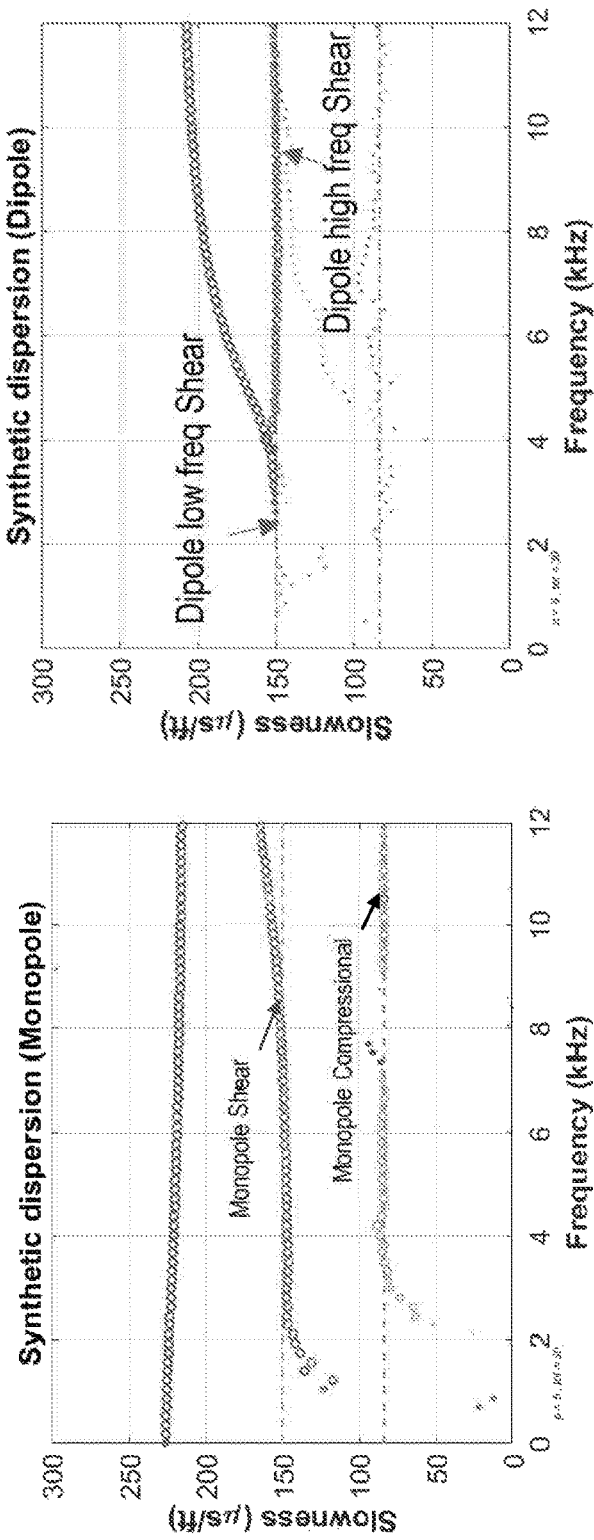
FIG. 7 illustrates synthetic dispersions from a monopole source (left) and a dipole source (right) in accordance with implementations of various techniques described herein, where formation's compressional and shear slownesses are identified by the arrows.

Referring also to FIG. 7 and in some implementations, synthetic dispersions from a monopole source (left) and a dipole source (right), respectively may be observed. A formation's compressional (P) and shear (S) slownesses may be estimated from the monopole dispersions at high frequencies. On the other hand, for dispersions from the dipole source, the formation shear (S) slowness may be estimated from the two dipole flexural modes: the lowest-order flexural mode which asymptotes to the formation shear (S) slowness at low-frequency (labeled as low frequency dipole mode) and the higher order flexural mode similarly asymptoting to the formation shear at high frequency (labeled high frequency dipole mode). Both modes may be used to estimate formation shear slowness, which we refer to as dipole low-frequency shear and dipole high frequency shear, respectively. In some implementations, high-frequency generally means above 8 kHz and low frequency means below 8 kHz. It should be noted that the frequency band selection may be tuned by the user and/or automatically set based on formation types, borehole sizes, etc.

Figure 8:
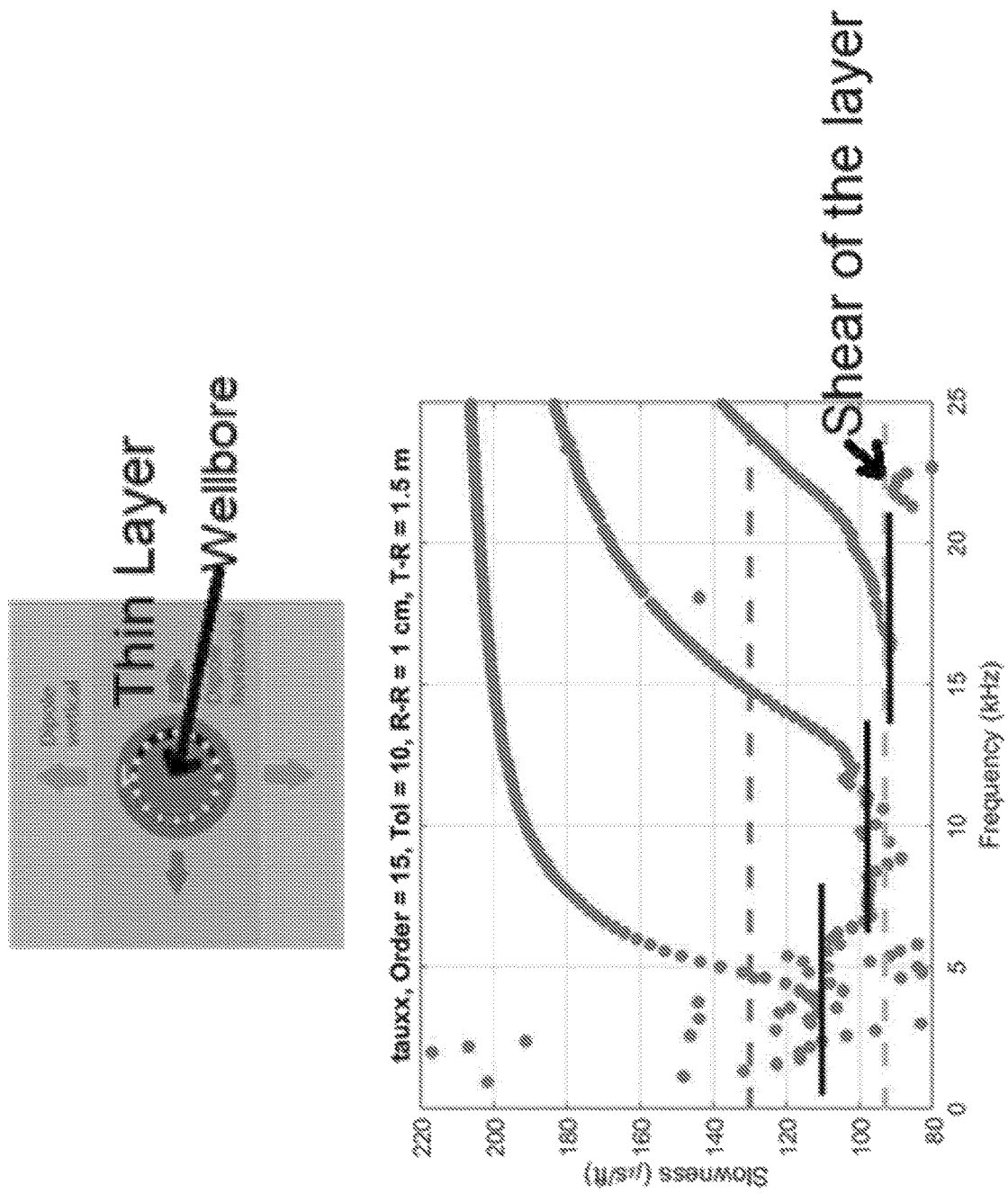
FIG. 8 illustrates dispersion plots for a synthetic example of a sonic logging simulation for a horizontal well drilled in a thin layer in accordance with implementations of various techniques described herein.

Referring also to FIG. 8 and in some implementations, a synthetic example of a sonic logging simulation is shown in a horizontal well drilled in a thin layer adjacent to layers taken to arbitrarily have the same slowness to each other but different from that of the thin layer. It may be observed that the higher order dipole mode can actually match the thin layer slowness while the lowest order dipole mode picks an averaged shear slowness. Consequently, the compressional (P) and shear (S) from monopole and the high-frequency shear (S) from higher-order dipole modes may be used as the high-resolution logs to get better layer resolution in either vertical or deviated or horizontal wells.

Formulation to Calculate the Average Slowness with Sub-Array Receivers

In some implementations, slowness log generation process 10 may determine the average slowness with different numbers of sub-array receivers to deal with the effect of receiver aperture. As stated earlier, this may be useful for vertical well applications. In a vertical well with horizontal lamination, the average slowness estimated from an m-receiver sonic tool can be written as a convolution in the form of Equation 1:

$$\overline{s(z)} = \int_{-L/2}^{L/2} F_m(l) s(lz) dl \qquad (1)$$

where $F_m(l)$ denotes the axial transformation function (or the tool response function [See U.S. Pat. No. 6,963,803, the contents of which are herein incorporated by reference in its entirety]) of a sonic tool with m axial receivers, and $s(l)$ represents the true slowness profile, and L is the length of receiver aperture. As such, $F_m(l)$ may satisfy Equation 2:

$$\int_{-L/2}^{L/2} F_m(l) dl = 1 \qquad (2)$$

Assuming the transformation function to be symmetric, $F_m(l)$ may be approximated as a quadratic function, as shown in Equation 3:

$$F_m(l) = a_1 l^2 + a_2 l + a_3 \qquad (3)$$

From Equation 2:

$$a_3 = \frac{12 - a_1 L^3}{12L} \qquad (4)$$

In some implementations, based upon the symmetry distribution with respect to l=0, (i.e., F(l)=F(l)), slowness log generation process 10 may obtain $a_2 = 0$.

Next, considering a simple case where a constant perturbation of Δs is located between receiver n−1 and n, we can have (n=1, 2, . . . , m 1), as shown below in Equation 5:

$$\overline{s} = s_r + \int_{\frac{(n-1)L}{m-1} - \frac{L}{2}}^{\frac{nL}{m-1} - \frac{L}{2}} F_m(l) \Delta s \, dl = s_r + \frac{6 + m(6(2+m) + a_1 L^3(1+m))}{6a_1 L^3 mn + 6a_1 L^3 n^2} \Delta s. \qquad (5)$$

Figure 9:
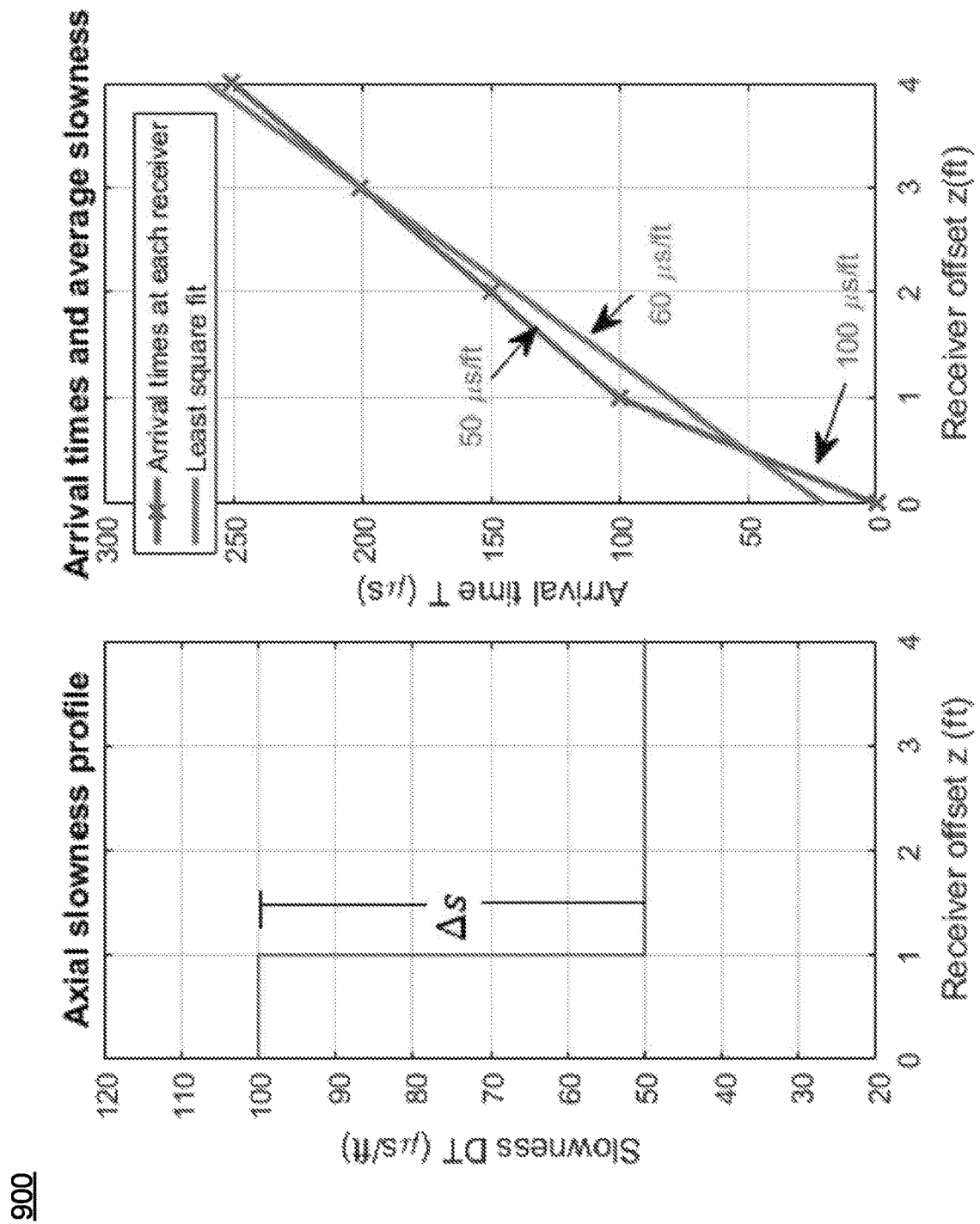
FIG. 9 illustrates an example of the average slowness with slowness perturbation between receiver 1 and 2 (L=4 ft, m=5, n=1) in accordance with implementations of various techniques described herein.
Figure 10:
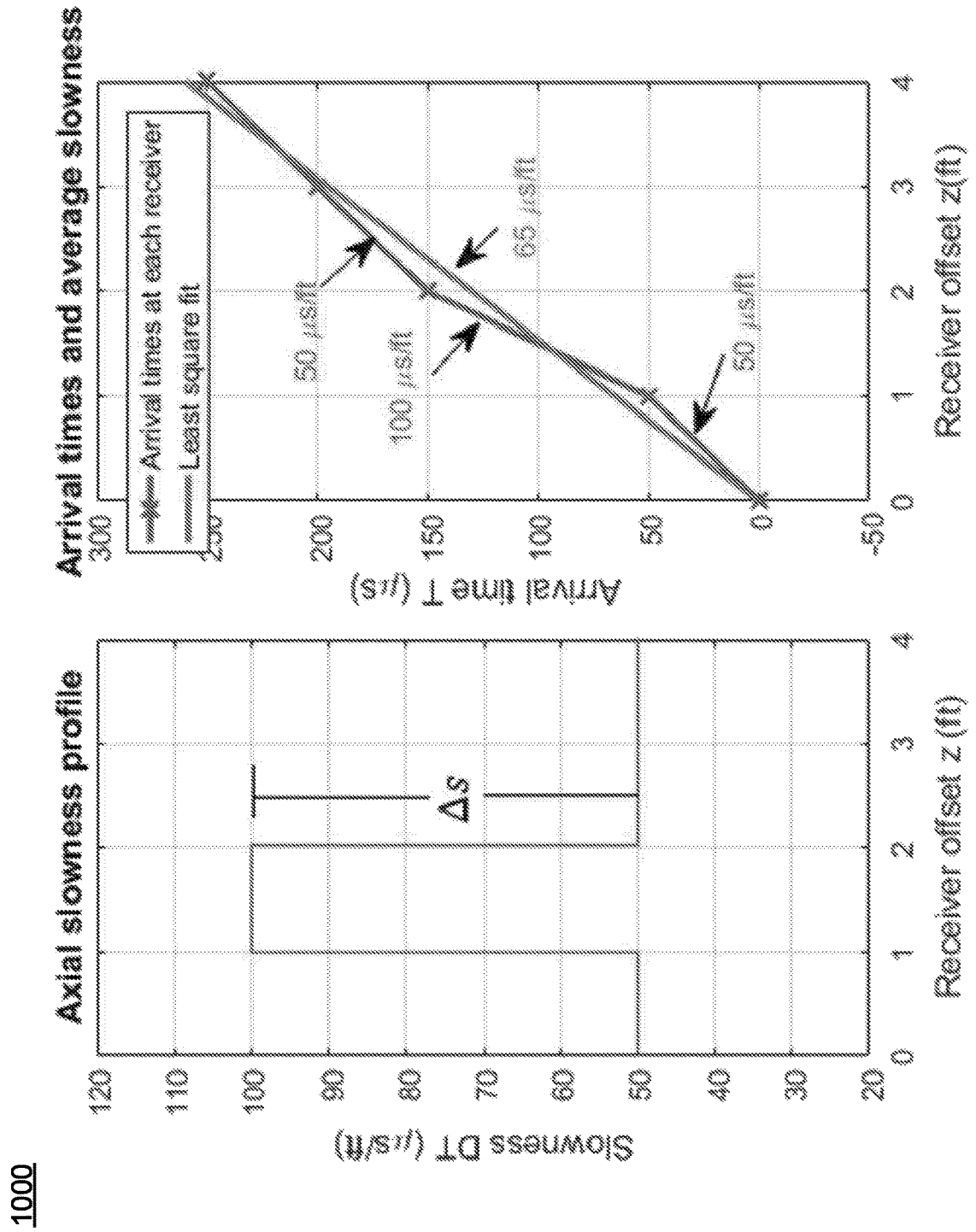
FIG. 10 illustrates an example of the average slowness with slowness perturbation between receiver 2 and 3 (L=4 ft, m=5, n=2) in accordance with implementations of various techniques described herein.

FIGS. 9-10 show examples on how the average slowness is calculated. For example and referring also to FIG. 9, assuming there is a slowness perturbation Δs of e.g., 50 μs/ft located between receiver 1 and 2 (left portion of FIG. 9), the ray-based arrival time for each receiver can be calculated by slowness log generation process 10 and are marked as blue 'x' (right portion of FIG. 9), and a standard least square fit of the 5 arrival times may give an average slowness of 60 μs/ft. Similarly, assuming there is a slowness perturbation of 50 μs/ft located between receiver 2 and 3 (left portion of FIG. 10), then the arrival time of each receiver is calculated and is marked as blue 'x' in right portion of FIG. 10, and a standard least square fit of the 5 arrival times give an average slowness of 65 μs/ft. In some implementations, based on the least square fit procedure described above from Equation 5, slowness log generation process 10 may analytically fit $a_1$ as:

$$a_1 = \frac{6(m-1)^2}{L^3 m(1+m)}. \qquad (6)$$

Substituting the expressions of $a_1, a_2$, and $a_3$ into equation 3, slowness log generation process 10 may get:

$$F_m(l) = \frac{L^2(3m^2+1) - 12l^2(m-1)^2}{2L^3 m(1+m)} \quad (7)$$

where $\frac{L}{2} \leq l \leq \frac{L}{2}$.

Finally, interpolating s(l) with an $m^{th}$-order Lagrange polynomial shape function and m consecutive receiver values $s_k$ (k=1, 2, ..., m), slowness log generation process 10 may obtain Equation 8:

$$s(l) = \sum_{k=1}^{m} N_k(l) s_k \quad (8)$$

where:

$$N_k(l) = \prod_{j=1 (j \neq k)}^{m} \frac{l \, l_j}{l_k \, l_j},$$

In some implementations, slowness log generation process 10 may obtain the average slowness with sub-array receivers as shown in Equation 9:

$$\bar{s} = \Sigma_{k=1}^{m} g_k s_k \quad (9)$$

where the coefficients $g_k$ may be evaluated explicitly as shown in Equation 10:

$$g_k = \int_{-L/2}^{L/2} F_m(l) N_k(l) dl \quad (10)$$

In some implementations, other functional approximations or representations for $F_m(l)$ may also be used in the general expression for the average slowness in Equations (9) and (10).

Based on the formulation of Equations 9 and 10 to calculate the average slowness, slowness log generation process 10 may derive an inversion algorithm that uses all sonic logs processed with different receiver aperture to invert for the high-resolution sonic log. For example, the high-resolution sonic log (the quantity that may be desirable to aim to invert for) at each measurement depth may be defined as a vector:

$$s = \begin{pmatrix} s_1 \\ s_2 \\ \vdots \\ s_n \end{pmatrix} \quad (11)$$

where n is the number of logging depths, and $s_1, s_2, \ldots,$ and $s_n$ are the slowness values at each depth.

In some implementations, the sonic logs measured by a sonic tool using either full array or sub-array receivers may be written as shown in Equation 12:

$$d^{(m)} = \begin{pmatrix} d_1 \\ d_2 \\ \vdots \\ d_n \end{pmatrix} \quad (12)$$

where superscript m indicates the number of receivers used in processing (e.g., $d^{(3)}$ stands for 3-receiver sub-array processing, and $d^{(5)}$ stands for 5-receiver sub-array processing).

In some implementations, slowness log generation process 10 may use the input sonic logs that have the same measurement depth. For example, for sonic tools with 13 receivers, the full array sonic logs, and logs with NRSA=11, 9, 7, 5, and 3, share the same measurement depth at receiver 7. However, it is worthy to point out that other input logs can also be used in the inversion.

In some implementations, from the convolution relationship defined in Equation 1, the relationship between s and $d^{(m)}$ may be defined as shown in Equation 13:

$$G^{(m)} s = d^{(m)} \quad (13)$$

where the transformation function, $G^{(m)}$, is a matrix defined as shown in Equation 14:

$$G^{(m)} = \begin{pmatrix} g_1 & g_2 & \cdots & g_m & & \\ & g_1 & g_2 & \cdots & g_m & \\ & & g_1 & g_2 & \cdots & g_m \end{pmatrix} \quad (14)$$

where $g_k$ is given by Equation 10.

If multiple measured logs are used (e.g., arising from multiple source excitations that share the same receiver sub-array size across the same interval), slowness log generation process 10 may construct an overdetermined linear equation as:

$$Gs = d \quad (15)$$

where G is shown in Equation 16:

$$G = \begin{pmatrix} G^{(m_1)} \\ \vdots \\ G^{(m_p)} \end{pmatrix} \quad (16)$$

and d is shown in Equation 17:

$$d = \begin{pmatrix} d^{(m_1)} \\ \vdots \\ d^{(m_p)} \end{pmatrix} \quad (17)$$

The high-resolution sonic log, s, may then be solved for by Equation 18:

$$s = G^+ d \quad (18)$$

where $G^+$ denotes the Moore-Penrose pseudoinverse of the matrix G. See Rao et al., "Generalized Inverse of Matrices and its Applications", New York: John Wiley & Sons. p. 240, 1971.

A quality control log can be obtained simply by the mismatch between the measured logs and the modeled logs of each receiver set m, as shown in Equation 19:

$$y^{m_p} = d^{m_p} G^{m_p} s \quad (19)$$

Figure 11:
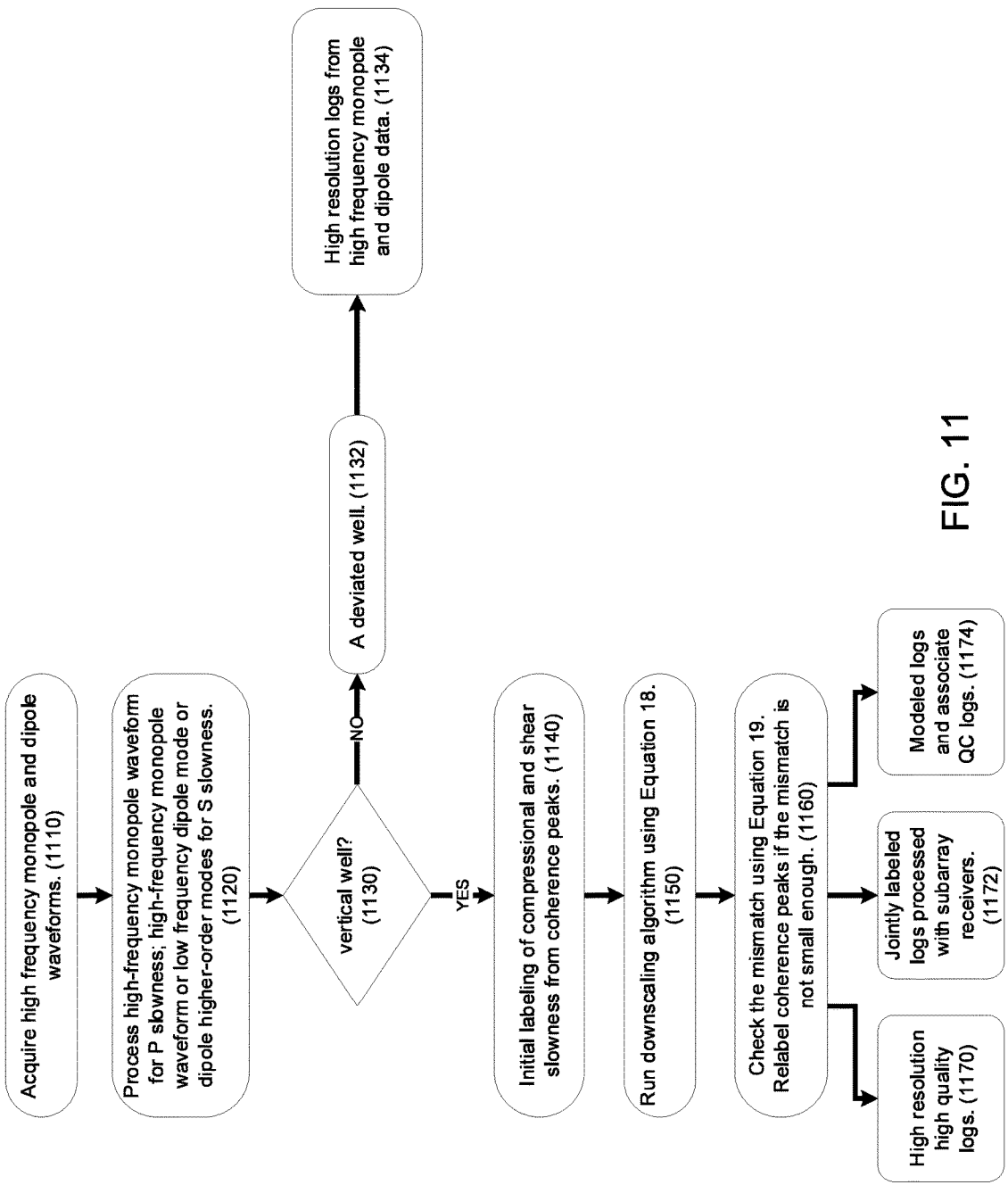
FIG. 11 illustrates a workflow to get high resolution sonic compressional and shear logs in either vertical or deviated wells in accordance with implementations of various techniques described herein.

Based on equations (18) and (19), a detailed inversion flowchart of slowness log generation process 10 to output high resolution and high-quality sonic logs is shown in FIG. 11.

FIG. 11 illustrates an example workflow to obtain high resolution sonic compressional and shear logs in either vertical or deviated wells in accordance with implementations of various techniques described herein. For example, slowness log generation process 10 may acquire 1110 high-frequency monopole and dipole waveforms through a sonic logging tool (e.g. sonic logging tool 60 in FIG. 1 and sonic logging tool 310 in FIG. 3). In some implementations, slowness log generation process 10 may process 1120 high-frequency monopole waveform for compressional (P) slowness. In some implementations, slowness log generation process 10 may process 1120 a high-frequency monopole waveform (see e.g. FIG. 6), a low-frequency dipole mode (see e.g. FIG. 6 and FIG. 7), and/or dipole higher-order modes (see e.g. FIG. 8) for shear (S) slowness. In some implementations, a decision 1130 is made to determine if the well is a vertical well. Specifically, if the well is a deviated well 1132, then high resolution logs are created 1134 from high frequency monopole and dipole data. In some implementations if the decision 1130 determines the well is a vertical well then slowness log generation process 10 may initially label 1140 compressional (P) and shear (S) slowness from a plurality of coherence peaks (see e.g. FIG. 5). As discussed above, slowness log generation process 10 may run 1150 a downscaling algorithm using Equation 18 for the high-resolution sonic log, s. In some implementations, slowness log generation process 10 may check 1160 the mismatch using a quality control log (see e.g. FIG. 18) and slowness log generation process 10 may relabel coherence peaks if the mismatch is not small enough (see e.g. FIG. 19). In some implantations, checking 1160 the mismatch using a quality control log results and relabeling the coherence peaks in obtains one or more of: the high-resolution logs 1170; jointly labeled logs processed 1172 with sub-array receivers; and modeled logs and associated quality control logs 1174. (See e.g. FIG. 18-19.)

Inversion Test Using Finite-Difference Synthetic Logs

In some implementations, slowness log generation process 10 may validate the inversion workflow discussed above using synthetic data. For example, for the forward modeling, a 2.5-dimensional finite-difference time domain (FDTD) modeling code may be used. See Randall et al., "Multipole borehole acoustic waveforms: Synthetic logs with beds and borehole washouts", Geophysics, 56(11), 1757-1769, 1991. The computation domain may be reduced to r-z dimensions by taking consideration of the axisymmetric conditions in the azimuthal dimension. In some implementations, the tool (e.g., sonic logging tool 60) may be placed inside a vertical fluid-filled borehole and may be moved upward to cross a horizontal thin layer of distinctively lower slowness than the background. To study the layer thickness effect on the inversion algorithm, the thickness of the thin layer may be set to be 6", 8", 10", and 12", respectively. The finite-difference grid size may be 0.1".

The boundary between the layer and the formation may be smoothed using the following 'error function' profile, as shown in Equation 20:

$$DT(z) = \left[\frac{1}{2}\text{erf}\left(\frac{2(z+w)}{w}\right)\frac{1}{2}\text{erf}\left(\frac{2(z-w)}{w}\right)\right](DT_{layer} - DT_{formation}) + DT_{formation} \quad (20)$$

where w denotes the half layer thickness.

Figure 12:
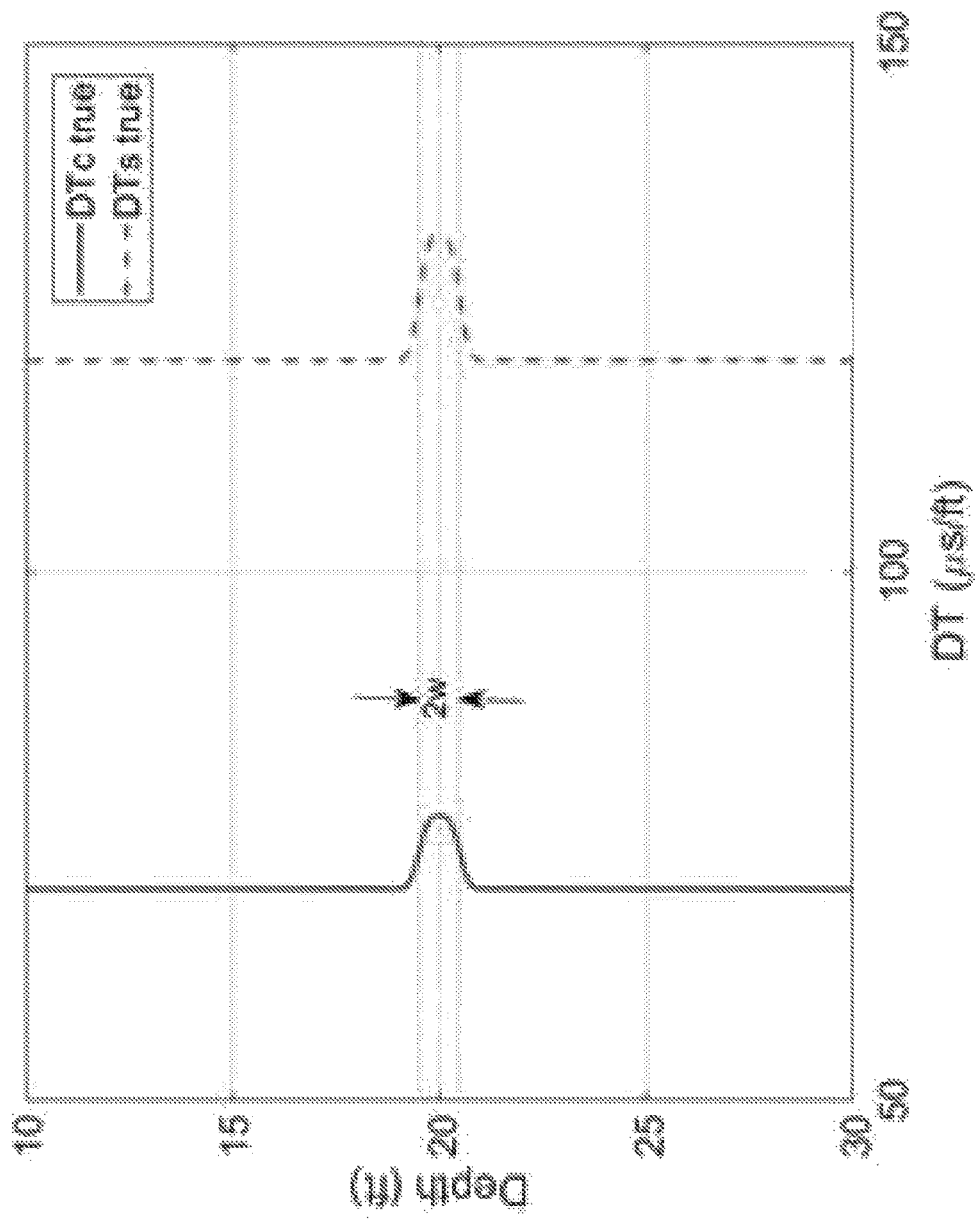
FIG. 12 illustrates slowness profiles for a formation with a 1-ft thin layer in accordance with implementations of various techniques described herein.
Figure 13:
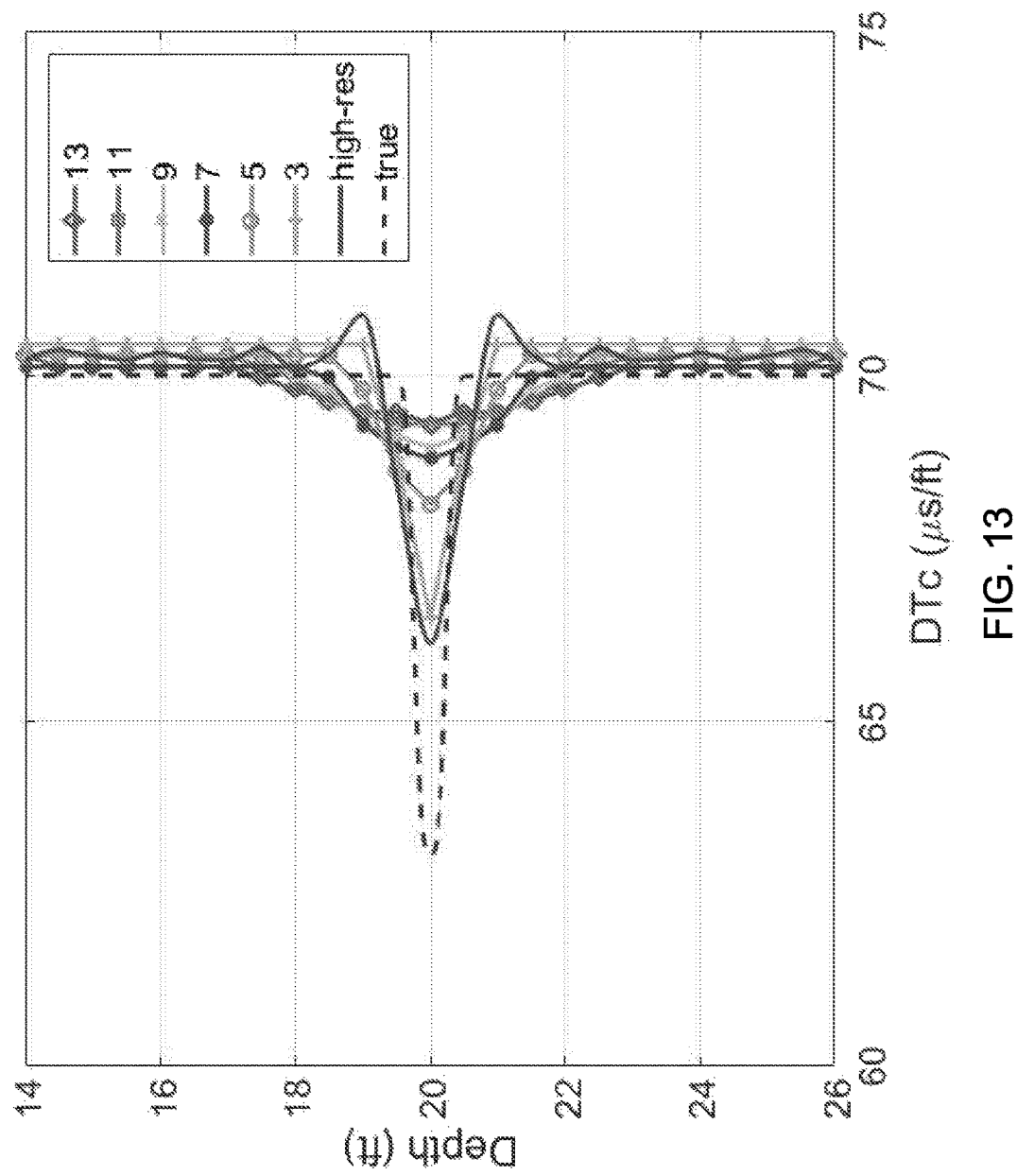
FIGS. 13-16 illustrate inversion results with a 10% stiff thin layer with thickness of 6", 8", 10" and 12", respectively in accordance with implementations of various techniques described herein.
Figure 14:
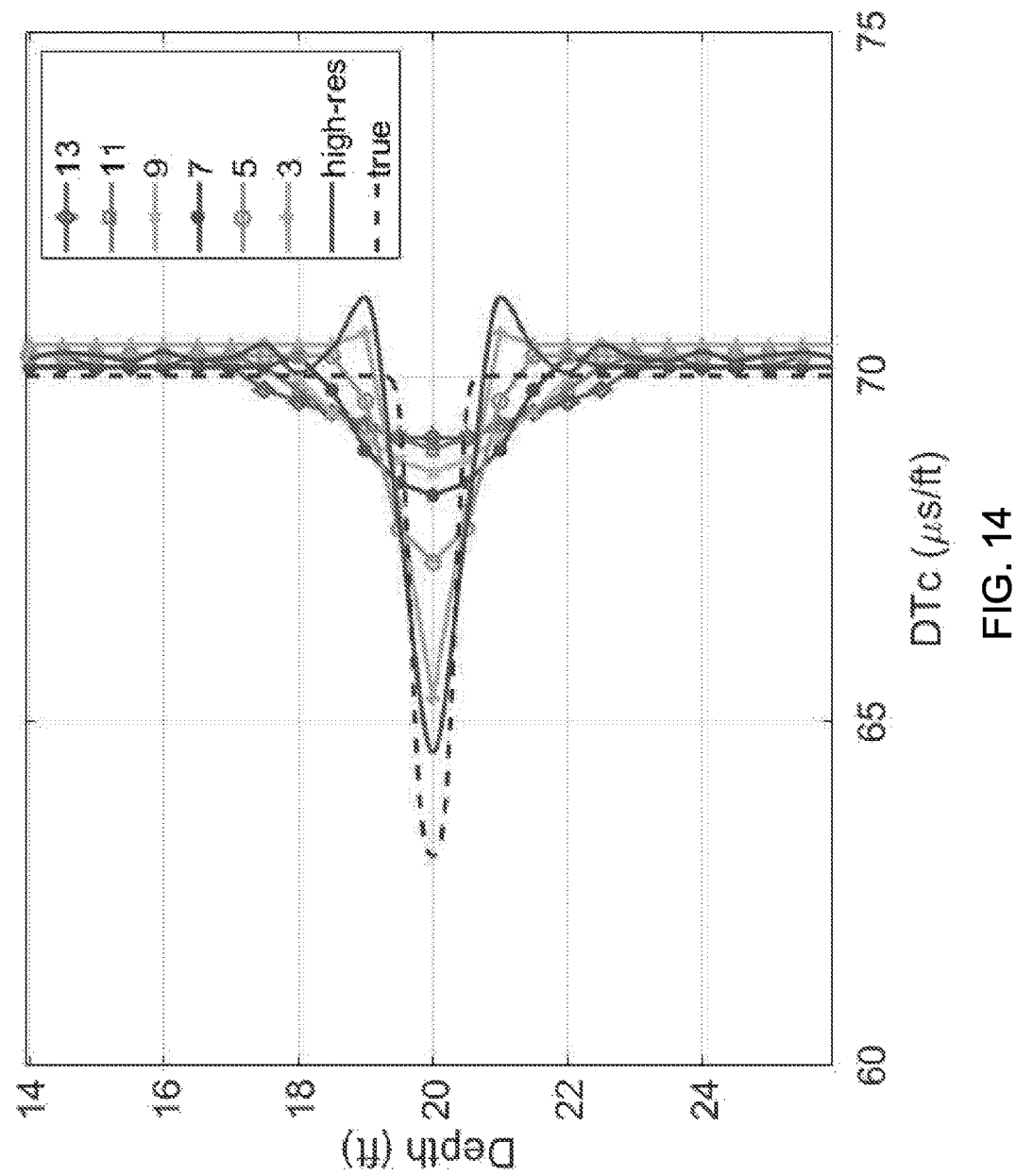
Figure 15:
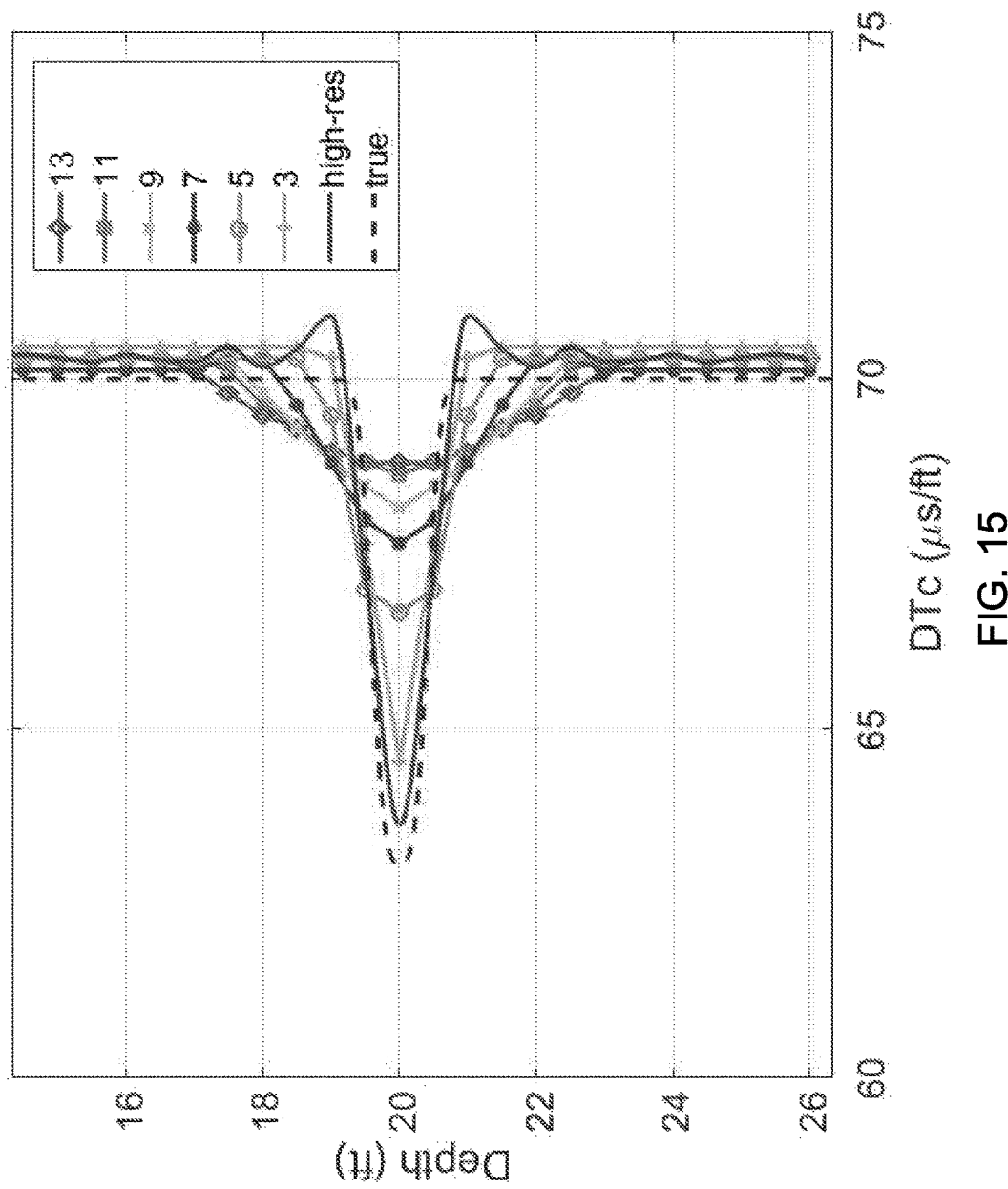

An illustrative example of this kind of profile is shown in FIG. 12. The elastic properties of the exemplary formation and the thin layer are listed in Table 1. The tool and borehole geometries are listed in Table 2:

TABLE 1

List of elastic properties of formation rocks

| | Formation | Stiff layer |
|---|---|---|
| DTc (μs/ft) | 70 | 63 |
| DTs (μs/ft) | 120 | 108 |
| Rho (g/cm$^3$) | 2.2 | 2.2 |

TABLE 2

List of sonic tool geometries (reflecting the geometry of the Sonic Scanner)

| Transmitter mode | Monopole |
|---|---|
| T-R spacing (ft) | 8 |
| R-R spacing (in) | 6 |
| Number of receivers | 13 |
| Central frequency (kHz) | 14 |
| Transmitter and receiver radius (in) | 4 |
| Borehole diameter (in) | 8.5 |

In some implementations, the modeling waveforms may be processed using the standard STC algorithm to get the compressional slowness from the high frequency monopole source with 14-20 kHz frequency filter and may be projected over depth to generate the synthetic log. STC processing parameters are listed in Table 3.

TABLE 3

STC processing parameters to obtain compressional slowness from FDTD modeling waveform

| STC window (μs) | 500 |
|---|---|
| Slowness min (μs/ft) | 40 |
| Slowness max (μs/ft) | 100 |
| Slowness step (μs/ft) | 0.2 |
| Semblance threshold | 0.5 |
| Filter type | 2$^{nd}$ order Cheby1 |
| Frequency Filter band (kHz) | 14 to 20 |

In some implementations, the input logs used in the inversion algorithm by slowness log generation process 10 may be the logs processed using 13, 11, 9, 7, 5, and 3 receivers, respectively. In some implementations, all of these logs may share the same measurement depth. The inversion results are labeled as 'high-res' log and are shown in FIGS. 13-16.

Figure 16:
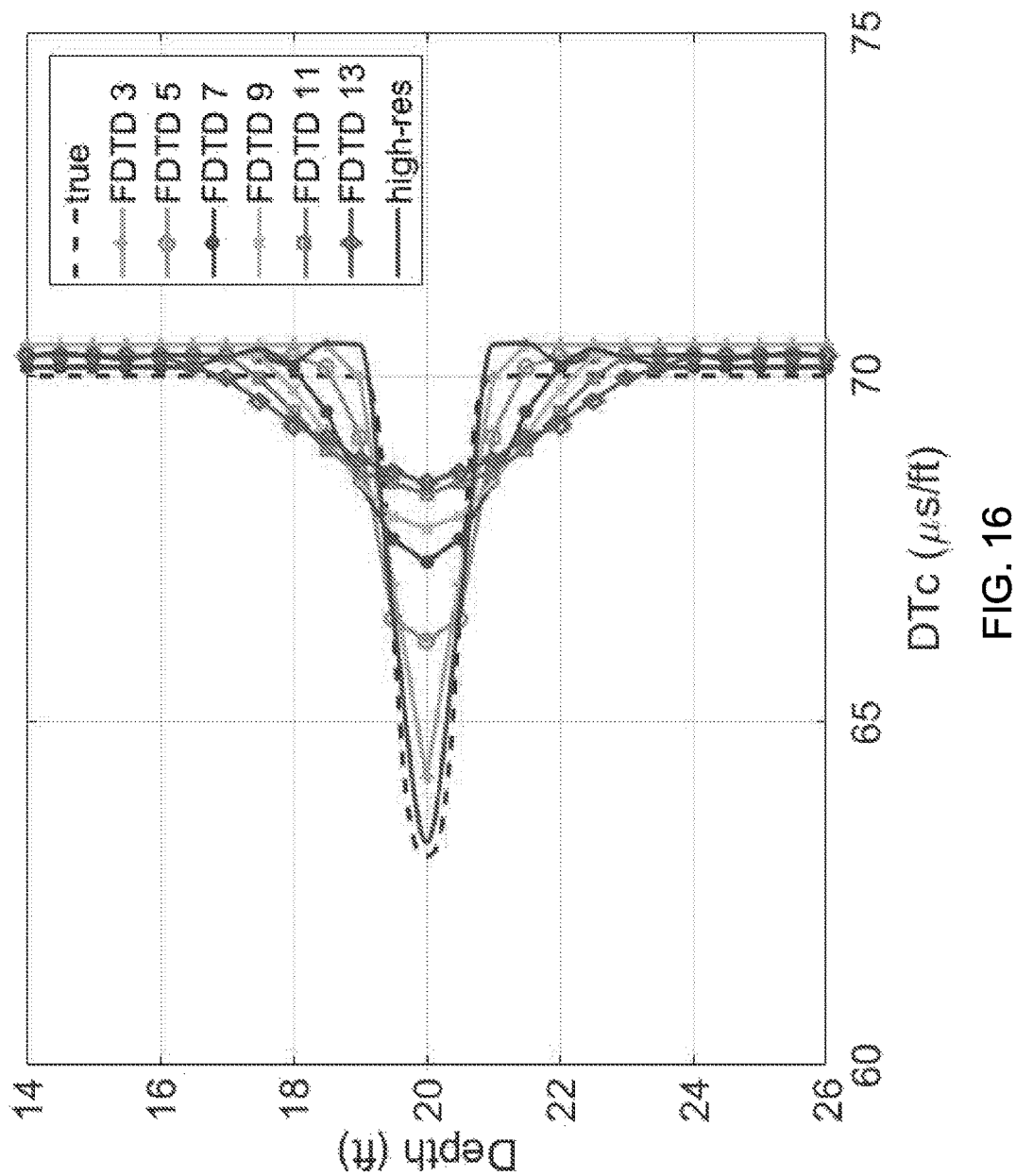

As can be seen in FIGS. 13-16, the inverted 'high-res' logs approximate closer to the true log than the input logs, and with a thicker layer, the inverted logs become more accurate. Referring also to FIG. 16 and in some implementations, with a 1-ft layer which matches the size of the smaller sub-array used (3 receivers spanning a 1-ft aperture), the inverted logs closely match the true profiles.

Applications on Synthetic Data for Outlier Removing

Figure 17:
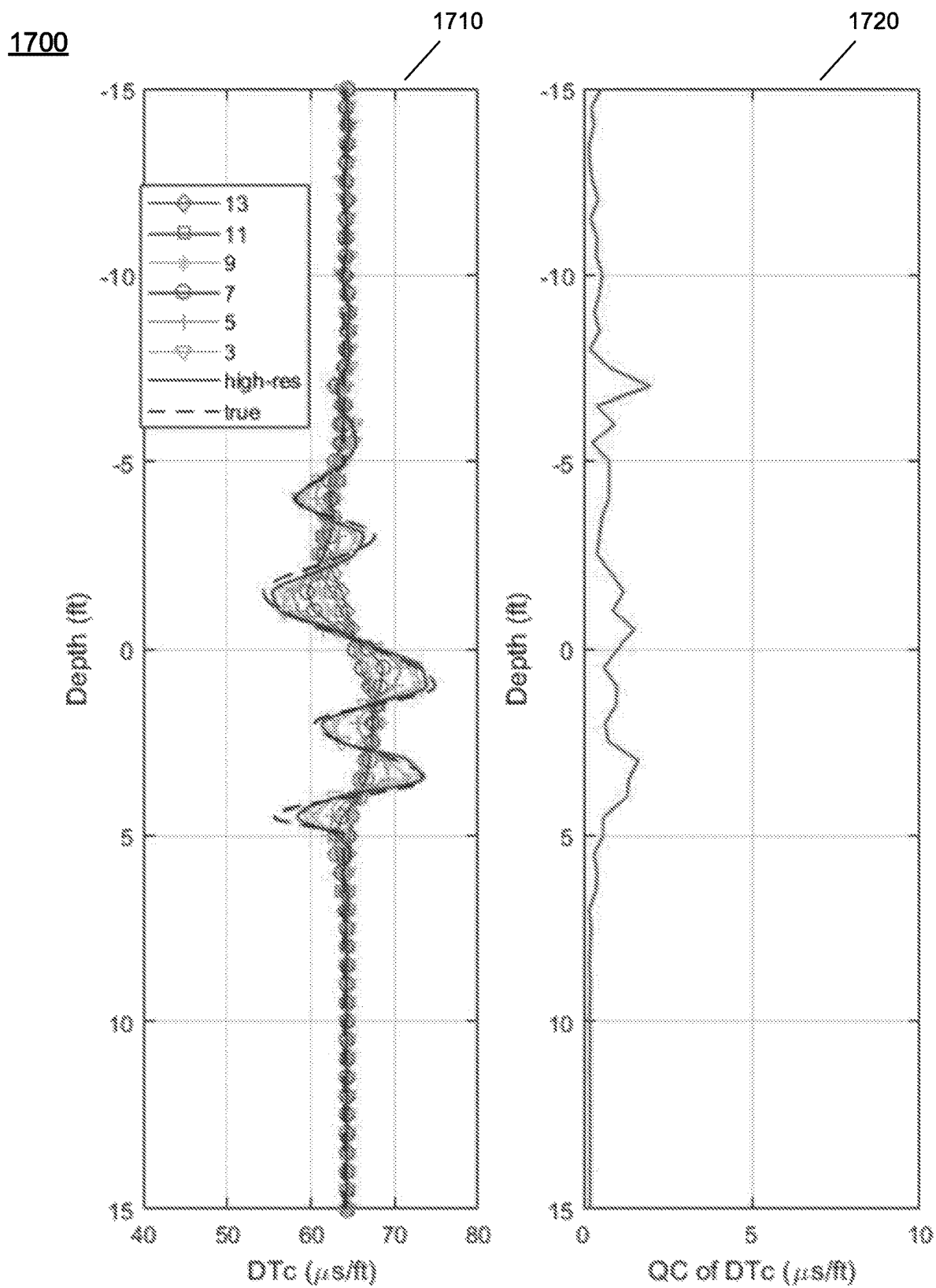
FIG. 17 illustrates a synthetic example of the inverted high-resolution logs spatially downscaled from STC processed sonic logs of an interval of 30 ft from a synthetic thinly laminated formation in accordance with implementations of various techniques described herein.

In some implementations, slowness log generation process 10 may be applied to a synthetic dataset to remove outliers. For example, the synthetic dataset may be from a vertical well. In one example, a case where the data of a Sonic Scanner is logged in a vertical open-hole section may be simulated. In this example, slowness log generation process 10 may be applied to the whole logging interval of e.g., 30 ft. Inversion result is shown in FIG. 17. For example, the first track plot 1710 of FIG. 17 may include the STC compressional logs processed with different number of axial receivers and the inverted high-resolution logs, respectively. The second track 1720 may plot the mismatch between the modeled logs and the input logs. In some implementations, STC may be processed using a synthetic waveform computed using finite-difference method.

Figure 18:
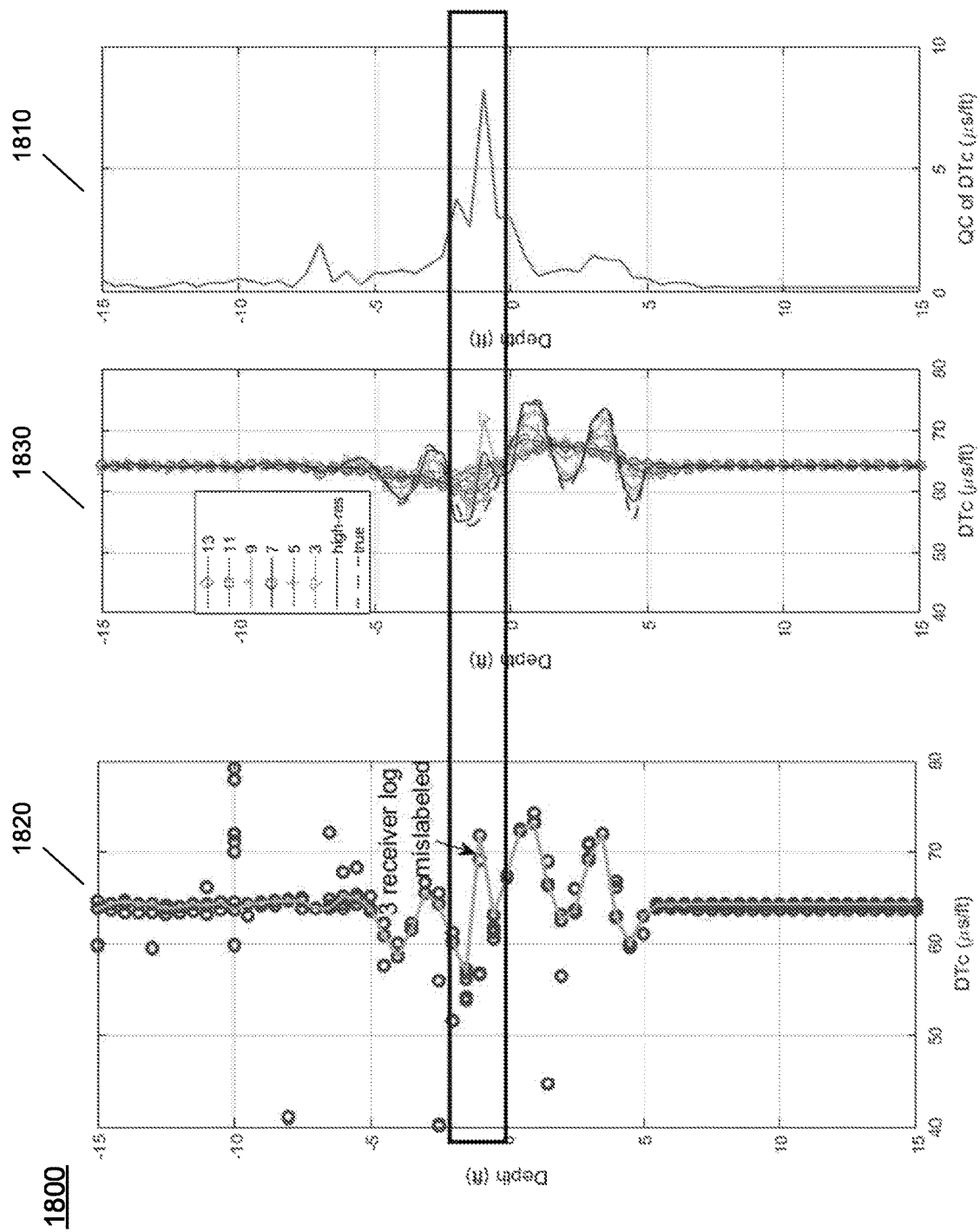
FIGS. 18-19 illustrate an example to show the comparison QC logs (right portion in each figure) from sonic logs with a mislabeling (FIG. 18) and sonic logs with good labeling (FIG. 19) in accordance with implementations of various techniques described herein.
Figure 19:
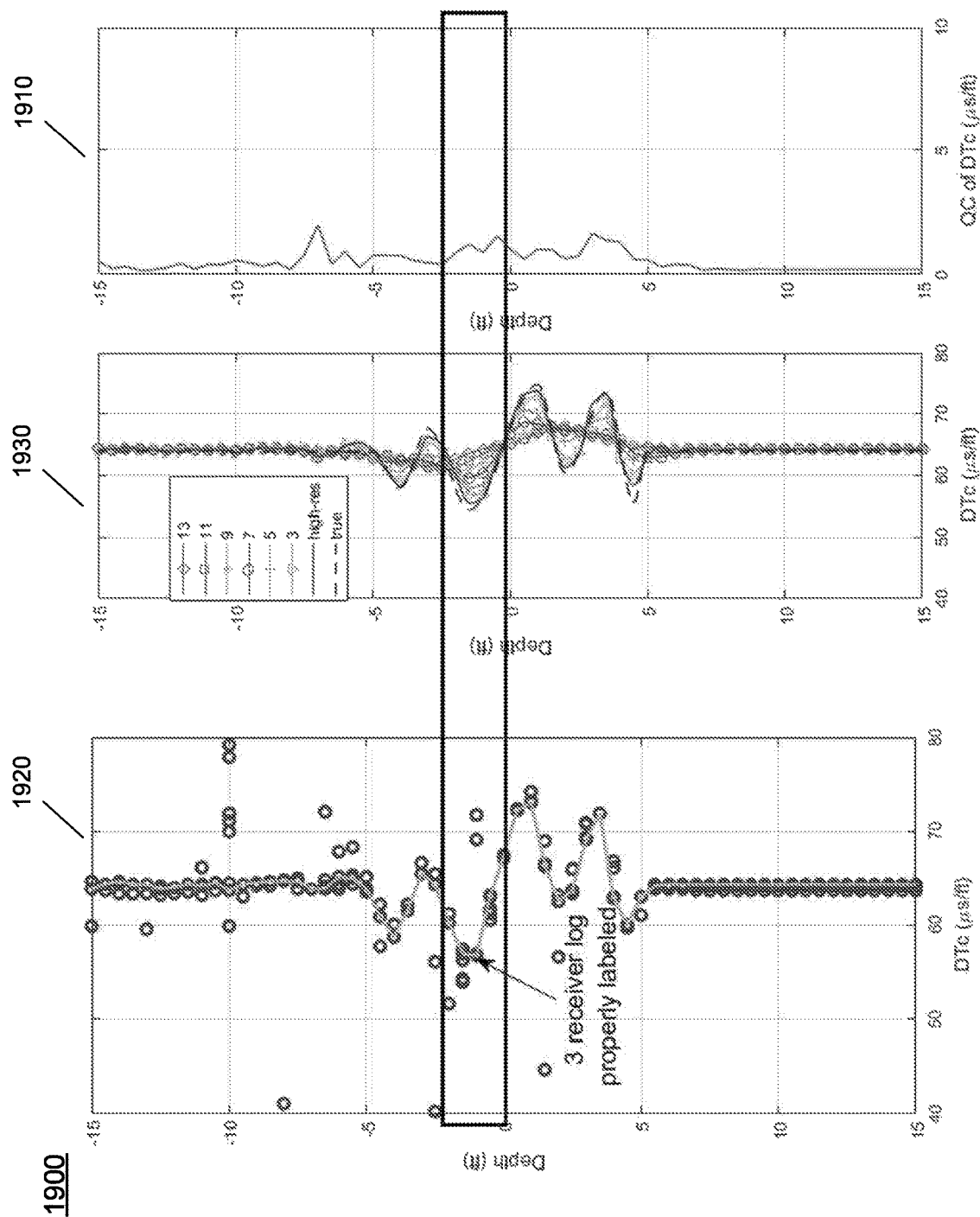

As illustrated by workflow chart in FIG. 11, slowness log generation process 10 may evaluate the mismatch that is used as a guide to label STC peaks. One illustrative example is shown in FIGS. 18-19, which show the comparison QC logs 1810, 1910 (e.g., right most portion of each figure) from sonic logs with an assumed mislabeling 1820 (shown in FIG. 18) and sonic logs with good labeling 1920 (shown in FIG. 19). The middle charts of FIGS. 18-19 are jointly labeled logs 1830, 1930 and illustrate the effect of a mislabeling. In some implementations, as shown in the interval marked with the rectangles, by minimizing the QC log, embodiments of slowness log generation process 10 may avoid the random mislabeling caused by noise, borehole conditions, layer reflections, and consequently can deliver good quality sonic logs.

In some embodiments, slowness log generation process 10 may be used with one or more deviated wells. In this example, the process may not use the transformation function to invert high-resolution logs. In contrast, the process may be configured to extract the high-order dipole mode for the high-resolution shear. (see, for example, block 1132 and 1134).

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A method for generating high resolution slowness logs, comprising:
   receiving a plurality of sonic logs from at least one sensor array; and
   generating at least one high-resolution slowness log from the plurality of sonic logs based upon, at least in part, monopole and dipole data from the plurality of sonic logs including
   defining an axial transformation function of the at least one sensor array; and
   inverting the plurality of sonic logs based upon, at least in part, the axial transformation function of the at least one sensor array.

2. The method of claim 1, wherein receiving the plurality of sonic logs includes:
   receiving the plurality of sonic logs from a plurality of sensor sub-arrays of the at least one sensor array, wherein each sensor sub-array comprises a different number of receivers.

3. The method of claim 1, further comprising:
   generating the plurality of sonic logs while the at least one sensor array crosses a thinly-laminated formation.

4. The method of claim 1, wherein generating the plurality of high-resolution slowness logs includes extracting one or more of compressional (P) logs and shear (S) logs from the plurality of sonic logs.

5. The method of claim 1, further comprising:
relabeling one or more coherence peaks if a mismatch between a reconstructed log and a measured log is above a certain threshold.

6. The method of claim 5, further comprising:
generating a quality control log from the mismatch between the reconstructed and measured logs; and
using the quality control log to select one or more coherence peaks and remove outliers.

7. A system comprising:
a memory; and
a processor configured to receive a plurality of sonic logs from at least one sensor array, wherein the processor is further configured to generate at least one high-resolution slowness log from the plurality of sonic logs based upon, at least in part, monopole and dipole data from the plurality of sonic logs
wherein the processor is further configured to define an axial transformation function of the at least one sensor array, and wherein the processor is further configured to invert the plurality of sonic logs based upon, at least in part, the axial transformation function of the at least one sensor array.

8. The system of claim 7, wherein the processor is further configured to receive the plurality of sonic logs from a plurality of sensor sub-arrays of the at least one sensor array, wherein each sensor sub-array comprises a different number of receivers.

9. The system of claim 7, wherein the processor is further configured to generate the plurality of sonic logs while the at least one sensor array crosses a thinly-laminated formation.

10. The system of claim 7, wherein the processor is further configured to extract one or more of compressional (P) logs and shear (S) logs from the plurality of sonic logs.

11. The system of claim 7, wherein the processor is further configured to relabel one or more coherence peaks if a mismatch between a reconstructed log and a measured log is above a certain threshold.

12. The system of claim 11, wherein the processor is further configured to generate a quality control log from the mismatch between the reconstructed and measured logs, and wherein the processor is further configured to use the quality control log to select one or more coherence peaks and remove outliers.

13. A computer program product residing on a non-transitory computer readable medium having a plurality of instructions stored thereon which, when executed by a processor, cause the processor to perform operations comprising:
receiving a plurality of sonic logs from at least one sensor array; and
generating at least one high-resolution slowness log from the plurality of sonic logs based upon, at least in part, monopole and dipole data from the plurality of sonic logs including
defining an axial transformation function of the at least one sensor array; and
inverting the plurality of sonic logs based upon, at least in part, the axial transformation function of the at least one sensor array.

14. The computer program product of claim 13, wherein the operations further comprise:
generating the plurality of sonic logs while the at least one sensor array crosses a thinly-laminated formation.

15. The computer program product of claim 13, wherein generating the plurality of high-resolution slowness logs includes extracting one or more of compressional (P) logs and shear (S) logs from the plurality of sonic logs.

16. The computer program product of claim 13, wherein the operations further comprise:
relabeling one or more coherence peaks if a mismatch between a reconstructed log and a measured log is above a certain threshold.

17. The computer program product of claim 13, further comprising:
identifying, prior to generating, a vertical well or a deviated well.

* * * * *